(12) United States Patent
Wolf

(10) Patent No.: US 10,882,419 B2
(45) Date of Patent: Jan. 5, 2021

(54) VEHICLE AND METHOD OF OPERATING THE VEHICLE

(71) Applicant: Bayerische Motoren Werke Aktiengesellschaft, Munich (DE)

(72) Inventor: Anton Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 184 days.

(21) Appl. No.: 15/730,819

(22) Filed: Oct. 12, 2017

(65) Prior Publication Data

US 2018/0029501 A1 Feb. 1, 2018

Related U.S. Application Data

(63) Continuation of application No. PCT/EP2016/056513, filed on Mar. 24, 2016.

(30) Foreign Application Priority Data

Apr. 13, 2015 (DE) .................. 10 2015 206 501

(51) Int. Cl.
*B60N 2/02* (2006.01)
*B62D 1/181* (2006.01)
(Continued)

(52) U.S. Cl.
CPC ............. *B60N 2/0224* (2013.01); *B60N 2/06* (2013.01); *B60N 2/22* (2013.01); *B60R 16/0232* (2013.01);
(Continued)

(58) Field of Classification Search
CPC .......... B60N 2/0224; B60N 2/06; B60N 2/22; B60N 2002/0268; B60R 21/01512;
(Continued)

(56) References Cited

U.S. PATENT DOCUMENTS 4,026,379 A * 5/1977 Dunn ..................... B60N 2/143
180/331
6,991,060 B2 * 1/2006 Chernoff .................. B60N 2/01
180/326
(Continued)

FOREIGN PATENT DOCUMENTS

DE 60 2004 003 887 T2 5/2007
DE 10 2006 032 769 A1 1/2008
(Continued)

OTHER PUBLICATIONS

International Search Report (PCT/ISA/210) issued in PCT Application No. PCT/EP2016/056513 dated Jun. 10, 2016 with English translation (five pages).
(Continued)

*Primary Examiner* — Nicholas Kiswanto
(74) *Attorney, Agent, or Firm* — Crowell & Moring LLP

(57) ABSTRACT

A vehicle is operable in a manual driving mode and in an at least partially automatic driving mode. To allow a rapid change from the automatic to the manual driving mode, the respective position of a driver seat and/or at least one driving-relevant cockpit element is adjusted for functional use by a driver of the vehicle such that the at least one driving-relevant cockpit element can be functionally used by the driver whenever the vehicle is, or is to be, operated in the automatic driving mode.

15 Claims, 3 Drawing Sheets

(51) Int. Cl.
  *B62D 1/28* (2006.01)
  *B60N 2/06* (2006.01)
  *B60N 2/22* (2006.01)
  *B60R 21/015* (2006.01)
  *B60R 16/023* (2006.01)
  *B60R 22/48* (2006.01)
  *B60W 50/14* (2020.01)

(52) U.S. Cl.
  CPC ........ *B60R 21/01512* (2014.10); *B60R 22/48* (2013.01); *B60W 50/14* (2013.01); *B62D 1/181* (2013.01); *B62D 1/28* (2013.01); *B60N 2002/0268* (2013.01); *B60R 2022/4841* (2013.01)

(58) Field of Classification Search
  CPC ................ B60R 16/0232; B60R 22/48; B60R 2022/4841; B60W 50/14; B62D 1/181; B62D 1/28
  See application file for complete search history.

(56) References Cited

U.S. PATENT DOCUMENTS

| | | | | |
|---|---|---|---|---|
| 9,096,150 | B2* | 8/2015 | Cuddihy | B60N 2/01 |
| 9,342,092 | B2* | 5/2016 | Baur | G05G 1/40 |
| 9,399,450 | B2* | 7/2016 | Raste | B60W 30/18136 |
| 9,597,983 | B2* | 3/2017 | Strasdat | B60N 2/24 |
| 10,023,091 | B2* | 7/2018 | Bendewald | B60N 3/001 |
| 2004/0262940 | A1* | 12/2004 | Johnson | B60N 2/3043 296/64 |
| 2005/0131609 | A1 | 6/2005 | Noda et al. | |
| 2013/0258512 | A1 | 10/2013 | Raz et al. | |
| 2015/0127224 | A1* | 5/2015 | Tabe | B60R 22/48 701/45 |
| 2016/0244070 | A1 | 8/2016 | Bendewald et al. | |
| 2017/0341648 | A1* | 11/2017 | Sanma | B60W 50/14 |

FOREIGN PATENT DOCUMENTS

| | | | | |
|---|---|---|---|---|
| DE | 2014-N19553 | * | 1/2013 | ............ B60N 2/02 |
| DE | 10 2013 205 287 A1 | | 10/2013 | |
| DE | 10 2012 213 965 A1 | | 2/2014 | |
| DE | 10 2013 000 632 A1 | | 7/2014 | |
| DE | 102013000632 A1 | * | 7/2014 | ............ G05G 1/40 |
| DE | 10 2013 110 865 A1 | | 4/2015 | |
| EP | 2 840 000 A2 | | 2/2015 | |

OTHER PUBLICATIONS

German-language Written Opinion (PCT/ISA/237) issued in PCT Application No. PCT/EP2016/056513 dated Jun. 10, 2016 (six pages).

German Search Report issued in counterpart German Application No. 10 2015 206 501.4 dated Feb. 26, 2016 with partial English translation (14 pages).

* cited by examiner

VEHICLE AND METHOD OF OPERATING THE VEHICLE

CROSS REFERENCE TO RELATED APPLICATIONS

This application is a continuation of PCT International Application No. PCT/EP2016/056513, filed Mar. 24, 2016, which claims priority under 35 U.S.C. § 119 from German Patent Application No. 10 2015 206 501.4, filed Apr. 13, 2015, the entire disclosures of which are herein expressly incorporated by reference.

BACKGROUND AND SUMMARY OF THE INVENTION

The present invention relates to a vehicle having a cockpit comprising the driver's seat and at least one driving-relevant cockpit element for functional use by a driver of the vehicle, wherein the vehicle can be operated in a manual driving mode and in an at least partially automatic driving mode. The invention also relates to a method for operating a vehicle having a cockpit comprising a driver's seat and at least one driving-relevant cockpit element for functional use by a driver of the vehicle, wherein the vehicle can be operated in a manual driving mode and in an at least partially automatic driving mode.

Such a vehicle can be, in particular, a motor vehicle. The invention is, however, not restricted to motor vehicles but can also be used in other vehicles such as, for example, rail vehicles, aircraft or ships.

Vehicles, in particular motor vehicles, having a manual driving mode have been known for a long time. These are vehicles which are operated by a driver of the vehicle, wherein the driver performs manually the control activities which are necessary for driving (e.g. braking, accelerating, steering). However, modern vehicles increasingly have assistance functions which permit a partially or completely automatic driving mode. Such system functions, which can relieve the driver of some of his tasks, or can facilitate these tasks, are also known as driver assistance systems. Examples which are known in motor vehicles include distance-based speed control systems, parking assistance systems, lane keeping assistance systems, braking assistance systems, and the like. Motor vehicles have already been publically presented which have a completely automatic driving mode which therefore drive without the driver's involvement. Such a completely automatic driving mode is referred to from time to time in the prior art as automatic driving, autonomous driving or piloted driving.

Since the driver is relieved of some or of all of his driving tasks when the vehicle is in a partially or completely automatic driving mode, the driver can then assume a position of rest corresponding to the reduced number of tasks he has to perform. In particular, when the vehicle is operated in a completely automatic driving mode, the driver can assume a comfortable position of rest. There can be provision that the driving mode changes. For example, a vehicle can change from a manual driving mode into an at least partially automatic driving mode if a section of a route lies ahead which can be coped with in this driving mode (e.g. a highly precisely measured route or a route with electronic position beacons). Conversely, a vehicle can change from an at least partially automatic driving mode into a manual driving mode if the driver wishes to assume complete control of the vehicle.

DE 10 2012 213 965 A1 describes a method for ensuring a sufficient performance capability of a driver of a motor vehicle driven by automated driving. In this context, in an automatic driving mode the driver is continuously requested at time intervals to respectively carry out a different task in the vehicle. As a result, the performance capability of the driver is continuously determined and checked. It can therefore be ensured that at any time the driver is ready to change over into the manual driving mode or into a partially automatic driving mode.

DE 10 2013 000 632 A1 describes a seat arrangement during the automated driving of the vehicle. In this context there is provision that a seat setting (e.g. backrest inclination) of a seat can be adjusted as a function of the driving mode. It is therefore possible, for example in the case of fully automated driving, to set the seat back in a highly inclined position so that the driver can assume a position of rest. It is also disclosed that in this driving mode the driver is provided with additional space by retracting the steering wheel into the dashboard.

Such a changeover into a manual driving mode is not possible in an arrangement as described in DE 10 2013 000 632 A1. Instead, it is absolutely necessary for the driver to be able to move safely in the fully automated driving mode at least for such a long period in the future as is necessary to alert the driver to the imminent assumption of his driving task and to reset the seat and, if appropriate, the steering wheel into the position which is suitable for the manual driving mode. This entails the disadvantage that, when there is doubt, the automatic driving mode cannot be set if a prompt safe return to the manual driving mode is not ensured.

Taking the prior art as a basis, the object is to provide a motor vehicle which permits a rapid change from an automatic driving mode into a manual driving mode.

This and other objects are achieved with a vehicle and a method of operating the vehicle in accordance with embodiments of the invention.

The vehicle according to the invention has a cockpit. The term cockpit refers here to the driver's place and includes not only his (the driver's) seat but also display elements and operator control elements which are provided for use by the driver. Another customary term for a cockpit is a driver's station. The cockpit comprises the driver's seat and at least one driving-relevant cockpit element for functional use by a driver for the vehicle. A driving-relevant cockpit element is an element of the cockpit which the driver uses to control the vehicle. The driving-relevant cockpit element can be, for example, a steering wheel, a mirror, an accelerator pedal, a brake pedal, and the like. In contrast, a cockpit element whose purpose is not directed to controlling the vehicle is not driving-relevant. For example, an operator control element of a car radio is, as a rule, not a driving-relevant cockpit element.

The vehicle according to the invention can be operated in a manual driving mode and in an at least partially automatic driving mode. The vehicle comprises a control device for automatically setting a position of the driver's seat and/or a position of the at least one cockpit element. The term automatic setting refers to a setting which is brought about by the control device and is carried out automatically by way of actuators which are connected to the control device. For example, the control device can actuate electric motors which move the driver's seat and/or the cockpit element. The control device is configured to set a first position of the driver's seat and a first position of the at least one driving-relevant cockpit element when the vehicle is operated in the manual driving mode. These first positions can be, in particular, those positions which are usually selected in a conventional vehicle which is known from the prior art when the vehicle is operated in the manual driving mode, that is to say when the driver controls the vehicle independently. The control device is also configured to set a second position of the driver's seat and/or a second position of the at least one driving-relevant cockpit element when the vehicle is operated in the automatic driving mode.

As has been described above, in a vehicle which is operated at least partially automatically the driver can be permitted to assume a sitting position which is more comfortable compared to the sitting position which is necessary or ideal for the manual driving mode. This can be brought about by setting the second position of the driver's seat.

Additionally or alternatively, the driver can be provided with more space by setting the driver-relevant cockpit element into the second position. For example, a steering wheel can be adjusted in the direction of the dashboard. In the prior art it is known which conditions have to be satisfied by the respective second positions in order to meet safety requirements. For example, it must be ensured that restraining systems of the vehicle (e.g. the seatbelt, airbag) are also effective in the second position of the driver's seat.

In addition to the abovementioned comfort aspects, there is a further advantage of setting the second position of the vehicle and/or the second position of the at least one driving-relevant cockpit element in that the driver can immediately and intuitively recognize whether the vehicle is being operated in the manual driving mode or in the automatic driving mode.

The vehicle according to the invention is characterized in that the control device is configured to set the second position of the driver's seat and/or the second position of the at least one driving-relevant cockpit element in such a way that the at least one driving-relevant cockpit element can be functionally used by the driver when the vehicle is operated or is to be operated in the automatic driving mode. In other words, the invention provides that although the position of the driver's seat and/or the position of the cockpit element can be adjusted in the automatic driving mode, this adjustment is limited by the fact that the cockpit element must still remain usable by the driver. The invention therefore permits the driver to exert or resume control over the vehicle at any time. In particular, the invention permits changing from the automatic driving mode into the manual driving mode without the need to wait for the time which is required for a change into the first position of the driver's seat and the first position of the cockpit element.

The invention is also beneficial if the driver determines the second position of the driver's seat himself. For this purpose, a preferred sitting position of the driver for an automatic driving mode could be stored in advance in the control device. The driver could also perform the setting of the sitting position himself after a change into the automatic driving mode has occurred in that he activates a corresponding operator control element to set the position of the seat. Therefore, the term automatic setting of the position of the driver's seat should also expressly be understood to mean such a setting which is brought about by the driver. After the driver has determined, and therefore defined, the second position of the seat, in order to implement the invention the second position of the at least one driving-relevant cockpit element is set in such a way that the at least one driving-relevant cockpit element can be functionally used by the driver when the vehicle is operated or is to be operated in the automatic driving mode.

Although the invention and/or individual embodiments have been explained and illustrated with respect to a single driving-relevant cockpit element, it is self-evident that the invention is in no way restricted to a single driving-relevant cockpit element. Instead, it is particularly advantageous to set a respective second position of a large number of, in particular all of, the driving-relevant cockpit elements in such a way that the cockpit elements can be functionally used by the driver when the vehicle is operated or is to be operated in the automatic driving mode.

Embodiments of the invention can provide that the setting of the position of the driver's seat comprises a change in a depth position and/or a change in a backrest inclination. A change in the depth position is a change in the position in the longitudinal direction of the vehicle. The driver's seat can therefore be moved forward or backward in the longitudinal direction of the vehicle. In an automatic driving mode, for example the seat can be moved rearward and the seat backrest can be inclined to a greater degree. This permits the driver a more comfortable sitting position and increases the free space in front of the driver. The type and the degree of the sitting position depend here on which driving tasks the driver has to perform. If, for example, a completely automatic driving mode is set, the driver does not have to perform any driving tasks at all and the seat can be set to a very comfortable position. According to the invention, limits are placed on this sitting position only to the extent of allowing the driving-relevant cockpit element to be used at any time by the driver. If, for example, the cockpit element is a steering wheel, a seat can only be adjusted to an extent which permits the driver to grasp and operate the steering wheel with his hands from his sitting position.

There can preferably be provision that the setting of the position of the at least one driving-relevant cockpit element comprises changing a height position and/or a depth position of the cockpit element.

A change in the depth of the position is a change in the position in the longitudinal direction of the vehicle. Changing the depth position, wherein the cockpit element is moved away from the driver, increases the free space in front of the driver. As a result, a gain in comfort can be obtained in an automatic driving mode. Since according to the invention the second position of the cockpit element is set in such a way that the cockpit element is used functionally by the driver, changing the depth position of the cockpit element is possible only to such a maximum extent that the driver can reach the cockpit element from his sitting position (defined by the second position of the driver's seat). For example, the second position of the cockpit element must be selected in such a way that from his sitting position the driver can reach with his hand a cockpit element which is to be operated manually. Likewise, the second position of the cockpit element has to be selected in such a way that from his sitting position the driver can reach with his foot a cockpit element which is to be operated with a foot. A cockpit element which is a driving-relevant display element must only be at such a distance from the driver that the driver can recognize the content of the display.

A change in the vertical position is a change in the position along the vertical axis of the vehicle. By changing the vertical position it is also possible to increase the free space in front of the driver, as a result of which a gain in comfort is achieved. Changing the vertical position can also have the purpose of permitting the cockpit element to continue to be used when the second position of the driver's seat is set. If, for example, the seat is adjusted rearward and the backrest set to a highly inclined position in the automatic driving mode, owing to his changed head position the driver can no longer see display elements or visual elements in an optimal way. Since the vertical position of the cockpit elements are changed, it is possible to ensure that the driver can see the display elements or visual elements even in the automatic driving mode.

In one embodiment of the invention, the at least one driving-relevant cockpit element is a steering wheel. The second position of the steering wheel can be selected such that the driver has more room in the automatic driving mode. For example, in the fully automatic driving mode the driver is permitted to read a newspaper, since in this driving mode it is not necessary for him to have control over the vehicle. Depth-adjustable steering wheels, that is to say steering wheels which can be moved into the plane of the dashboard or out of this plane are known per se in the prior art. Such an automatically movable steering wheel can be used to implement the invention by virtue of the fact that in the automatic driving mode it is moved away from the driver into the plane of the dashboard. It is essential that the driver can reach and activate the steering wheel (which is in the second position of the steering wheel) with his hands even from the sitting position in which he assumes in the automatic driving mode owing to the second position of the driver's seat which is then set.

In one embodiment of the invention, the at least one driving-relevant cockpit element is a pedal, in particular a brake pedal or an accelerator pedal. There can be provision that the second position of the pedal is selected in such a way that the driver has more legroom in the automatic driving mode. As is explained above for the steering wheel, in the second position of the pedal it is also essential that it continues to be usable for the driver.

In one embodiment of the invention, the at least one driving-relevant cockpit element is a head-up display. Such a head-up display, which is usually arranged in the viewing direction of the driver onto the road, serves for displaying driving-relevant information (e.g. instantaneous speed, warnings and the like). So that the driver can use the head-up display even when viewing the road in his sitting position which is assumed in the automatic driving mode, there can be provision to adjust the vertical position of the head-up display. If, for example, the second position of the driver's seat comprises a sitting face which is shifted rearward, with respect to the first position of the driver's seat and a backrest inclination which is inclined to the rear, the driver's head is located further down and further to the rear compared to the head position in the manual driving mode. Since the head-up display is shifted upward, in this case it is possible to ensure that the driver can recognize the displayed information when viewing the road from his changed position. Alternatively or additionally, there can be provision to increase the display in order to compensate for the increased distance of the driver from the head-up display.

In one embodiment of the invention, the at least one driving-relevant cockpit element is a mirror, in particular an exterior rearview mirror or a rearview mirror. Setting the position of the mirror can comprise, in particular, setting an angle of inclination of the mirror face. For example, there can be provision for the mirror faces of the two exterior rearview mirrors and of the rearview mirror of a motor vehicle in the automatic driving mode to be set to the position which is then assumed by the driver's head, in such a way that these mirrors provide the driver with the best possible view to the rear.

In a further advantageous refinement, the control device is also configured to set the tautness of a seatbelt of the driver and/or a position of a belt retainer of the seatbelt, wherein the control device is configured to set the tautness of the seatbelt and/or the position of the belt retainer in such a way that the at least one driving-relevant cockpit element can be functionally used by the driver when the vehicle is operated or is to be operated in the automatic driving mode. In order to increase the driver's comfort in an, in particular, completely automatic driving mode, it is known to reduce the tautness of the seatbelt and/or the position of the belt retainer of the seatbelt in such a way that the seatbelt fits comfortably, which is referred to below as adapting the seatbelt. It should always be noted here that the seatbelt is not adversely affected in its safety position. The seatbelt can advantageously be adapted in such a way that in the automatic driving mode the seatbelt does not make functional use of the cockpit element more difficult. For example, the tautness of the seatbelt can be reduced in such a way that it is possible for the driver to move his upper body and/or arms with respect to the cockpit element.

A further advantageous refinement of the invention provides the vehicle with a detection device, in particular a passenger compartment camera, connected to the control device. In this context, the control device is configured to determine a body size and/or a sitting position of the driver by processing data, in particular images, acquired by the detection device. Furthermore, the control device is configured to set the second position of the driver's seat and/or the second position of the at least one driving-relevant cockpit element as a function of the determined body size and/or sitting position of the driver. In other words, a recording of the driver is produced by means of the detection device which is particularly advantageously a passenger compartment camera which is directed onto the driver. The recording can be processed using image processing methods which are known from the prior art, in order to determine the body size and/or the sitting position of the driver, wherein, in particular, even a position of the driver's head can be determined. The control unit can determine the second position of the driver's seat and/or the second position of the cockpit element from the known conditions of the vehicle and from the determined body size and/or sitting position of the driver, in such a way that, on the one hand, the driver can be provided with the best possible comfort and, on the other hand, it can be ensured that the at least one driving-relevant cockpit element can be functionally used by the driver.

The control device is particularly advantageously configured to request the driver, by way of a display device of the vehicle, to use the at least one driving-relevant cockpit element if the second position of the driver's seat and/or the second position of the at least one driving-relevant cockpit element is set. It can therefore be checked whether the present settings (that is to say the second position of the driver's seat and the second position of the cockpit element) satisfy the condition as to whether the cockpit element can be used. Such checking is appropriate when the vehicle is activated if said vehicle is still in the stationary state. If a change into the automatic driving mode then takes place at a later time, the checking carried out in advance ensures that the driver can use the cockpit element. It can also be advantageously provided that the use of the cockpit element is checked. In the event of the checking failing, that is to say the driver not being in a position to use the cockpit element, the second position of the driver's seat and/or the second position of the cockpit element is changed. Subsequently, by means of the display device the control device can request the driver again to use the cockpit element and check the use.

This can be repeated until the second position of the driver's seat and the second position of the cockpit element are set satisfactorily.

The method according to the invention serves to operate a vehicle with a cockpit comprising a driver's seat and at least one driving-relevant cockpit element for functional use by a driver of the vehicle, wherein the vehicle can be operated in a manual driving mode and in an at least partially automatic driving mode. In a first method step according to the invention, a first position of the driver's seat and a first position of the at least one driving-relevant cockpit element are set when the vehicle is operated in the manual driving mode. In a second method step according to the invention, a second position of the driver's seat and/or a second position of the at least one driving-relevant cockpit element are set when the vehicle is operated or is to be operated in the automatic driving mode, in such a way that the at least one driving-relevant cockpit element can be functionally used by the driver. The method steps can be carried out by a control device of the vehicle.

In one advantageous development, a body size and/or a sitting position of the driver are additionally determined. This may be done, for example, by use of a passenger compartment camera. The second position of the driver's seat and/or the second position of the at least one driving-relevant cockpit element are then set as a function of the determined body size and/or sitting position of the driver.

In a further refinement there is provision that a request to use the at least one driving-relevant cockpit element is output if the second position of the driver's seat and/or the second position of the at least one driving-relevant cockpit element are set. There can also be provision as described above that a successful use of the cockpit element is checked and that, if appropriate, the second position of the driver's seat and/or the second position of the at least one driving-relevant cockpit element are adapted until the driver has successfully used the cockpit element after receiving the request.

Other objects, advantages and novel features of the present invention will become apparent from the following detailed description of one or more preferred embodiments when considered in conjunction with the accompanying drawings.

DETAILED DESCRIPTION OF THE DRAWINGS

Identical reference symbols in the figures characterize identical features of the illustrated embodiments of the invention. It is to be noted that the illustrated figures and the associated description merely relate to exemplary embodiments of the invention. In particular, illustrations of feature combinations in the figures and/or the description of the figures should not be interpreted as meaning that the invention necessarily requires the implementation of all the specified features. Other embodiments of the invention can contain fewer, more and/or other features. The scope of protection and the disclosure of the invention emerge from the appended patent claims and the entire description. It is also to be noted that the illustrations are basic illustrations of embodiments of the invention. The arrangements of the individual illustrated elements with respect to one another is selected only in exemplary fashion and can be selected differently in other embodiments of the invention. Furthermore, the illustration is not necessarily true to scale. Individual illustrated features can be illustrated in an enlarged or reduced fashion for the sake of better illustration.

Figure 1:
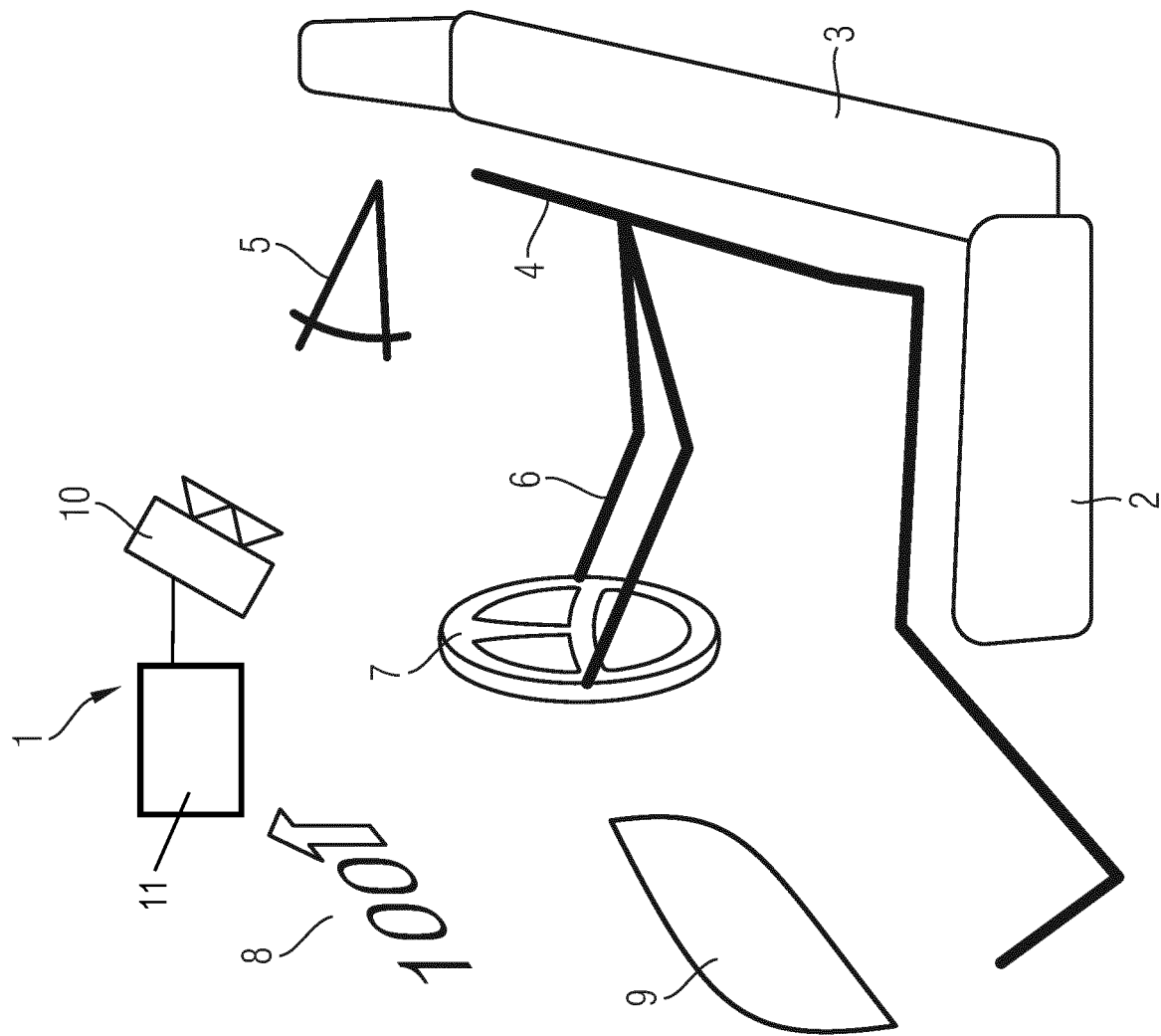
FIG. 1 is a schematic diagram of a cockpit of a vehicle according to an embodiment of the invention in a manual driving mode.

FIG. 1 shows a cockpit 1 of a motor vehicle according to an embodiment of the invention in a manual driving mode. The illustration is to be understood as a basic illustration, wherein the individual elements are shown in an isolated and stylized fashion. The seat bottom 2 and the backrest 3 of the driver's seat are located in the first position. The upper body 4 of the driver is in a largely upright position. The driver has directed his arms 6 toward the steering wheel 7 and grips the steering wheel 7 with his hands. The driver's head 5 is positioned in such a way that the driver can direct his gaze onto the road (not illustrated) through the windshield. In this viewing path a head-up display 8 is arranged on which driving-relevant information can be displayed to the driver, for example an applicable permissible maximum speed and a gearshift recommendation. An exterior rearview mirror 9 of the vehicle, with which the driver can see an area lying directly behind him, is also illustrated.

The cockpit can, of course, also have further driving-relevant cockpit elements (not illustrated), for example a second exterior rearview mirror, a rearview mirror, accelerator pedals and the like. In the situation shown in FIG. 1 a seatbelt (not illustrated) rests tautly on the upper body 4 and on the driver's lap. The passenger compartment camera 10 is directed onto the driver's upper body 4, arms 6 and head 5. The passenger compartment camera 10 therefore records the sitting position and the dimensions of the driver's body. The passenger compartment camera 10 is connected to a control device 11 for further processing of the recorded images through a data connection.

Figure 2:
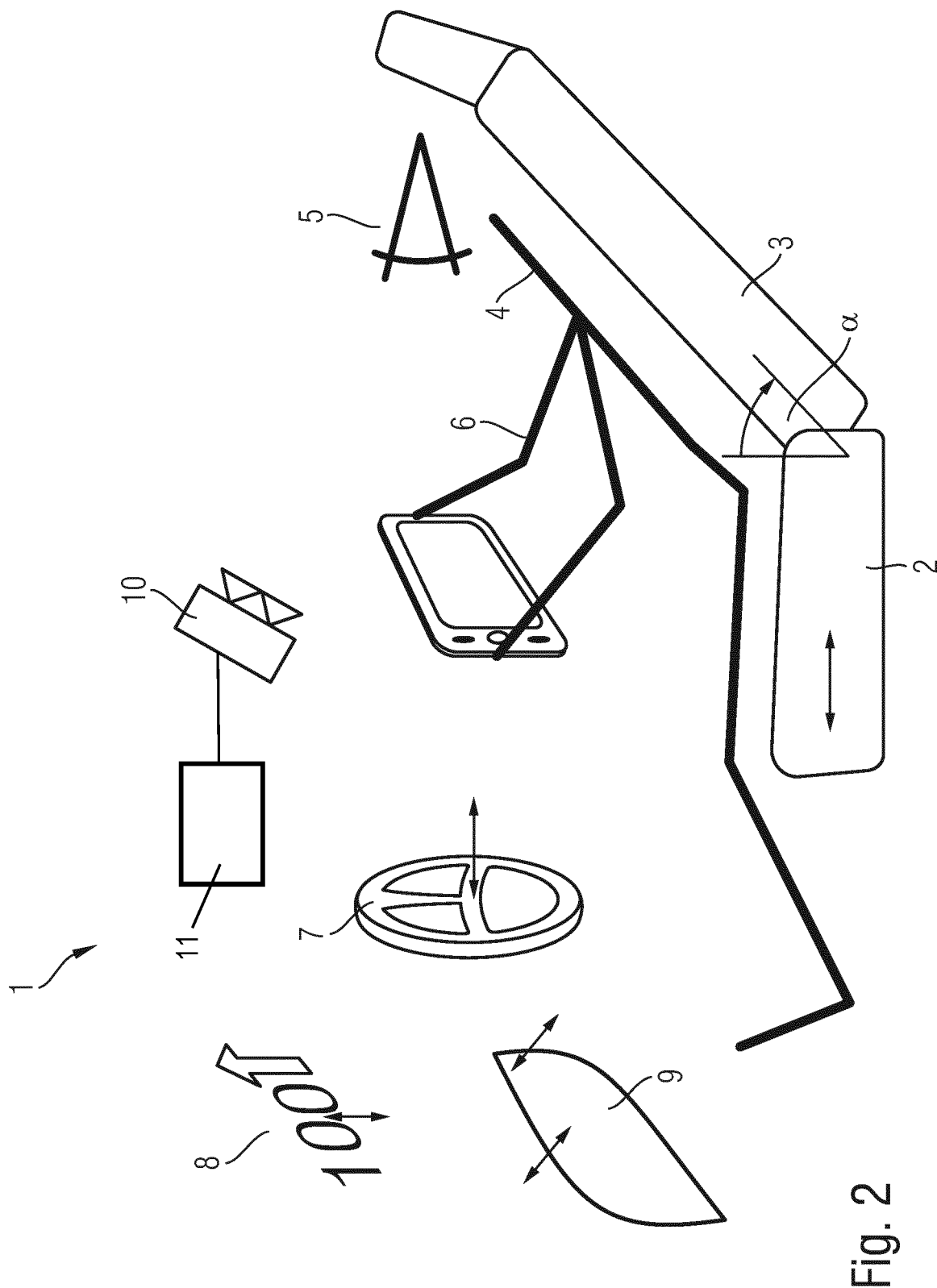
FIG. 2 is a schematic diagram of a cockpit of a vehicle according to an embodiment of the invention in a completely automatic driving mode in a first driving situation.

FIG. 2 shows a cockpit 1 of the motor vehicle according to an embodiment of the invention in a completely automatic driving mode. In this completely automatic driving mode, the driver does not have to assume or monitor any driving tasks. The result is that the driver can dedicate himself completely to other tasks if he wishes to. The respective directions of movement in which the seat and the driving-relevant cockpit elements can be adjusted are indicated by double arrows. In comparison with the driving situation illustrated in FIG. 1, it is apparent that the seat bottom 2 of the driver's seat is shifted rearward and the backrest 3 of the driver's seat is in a highly inclined position. The angle of inclination $\alpha$ between the position of the backrest 3 in FIG. 1 and the position of a backrest 3 in FIG. 2 is shown in FIG. 2. The driver's upper body 4 rests against the backrest 3, with the result that the driver is in a comfortable sitting position. With his arm, 6 the driver holds an entertainment electronic device, e.g. a tablet. The second position of the driver's seat as illustrated in FIG. 2 may have been set by the control device 11 on the basis of prescriptions by the driver. For example, the driver may have used operator control elements (not illustrated) to select a sitting position which suits him. Likewise, it is possible for the second position of a driver's seat to have been set without the driver's involvement. The passenger compartment camera 10 records the position of the driver illustrated in FIG. 2 and transfers recordings which have been made to the control device 11.

The latter determines, in particular, the position and the dimensions of the driver's upper body 4, arms 6 and head 5. From the data determined in this way, the control device 11 can determine the second position of the driving-relevant cockpit elements 7, 8, 9 in such a way that said cockpit elements 7, 8, 9 can be functionally used by the driver.

In its second position, the steering wheel 7 is moved further into the dashboard (not illustrated) of the motor vehicle, as a result of which the space in front of the driver is made larger. However, in its second position the steering wheel 7 is shifted in the direction of the dashboard only to a certain extent that it remains usable by the driver. The driver can therefore reach, grip and operate the steering wheel 7 with his arms 6. In a second position, the head-up display 8 is shifted downward, with the result that from his head position 5 the driver can view the head-up display 8 when looking onto the road from the windshield. Owing to the increased distance from the driver's head 5 to the head-up display 8, the content displayed on the head-up display 8 can be displayed in an enlarged form. In its second position, the exterior rearview mirror 9 is tilted in such a way that from his head position 5 the driver can see the area next to and behind the vehicle in an optimum way by means of the mirror 9. In the situation shown in FIG. 2, the seatbelt (not illustrated) rests on the driver's upper body 4 and on his lap. The seatbelt is, in particular, set in such a way that the steering wheel 7 continues to be usable for the driver. In other words, the seatbelt is set in such a way that the driver can grip the steering wheel 7.

It is to be noted that it is not absolutely necessary for a cockpit element to be usable from the driver's position which is assumed in the automatic driving mode. It is possible to ensure that the driver can move. In contrast, it is absolutely necessary for a cockpit element to be usable without moving itself (that is to say, without a movement of the cockpit element) and without a movement of the driver's seat. In the example shown in FIG. 2, the steering wheel 7 can therefore be set, for example, in such a way that the driver would have to place his upper body 4 in an upright position in order to grip the steering wheel 7, which is illustrated in FIG. 3.

In the embodiment of the invention provision can be made that it is checked whether the cockpit elements are functionally usable in the respective second positions. For this purpose, a checking routine can be carried out which preferably can take place in the stationary position of the vehicle before travel commences. For this checking routine the respective second positions of the driver's seat 2, 3 and the cockpit elements 7, 8, 9 are set. The driver is then requested by way of the head-up display 8 or some other display device of the vehicle to grip and move the steering wheel 7. Likewise, the driver can be requested to confirm whether he can see the head-up display 8 and mirror 9 satisfactorily. If this is not successful, the steering wheel 7 can be moved a certain amount in the direction of the driver, or the seat bottom 2 can be moved a certain amount in the direction of the steering wheel 7. The head-up display 8 and the mirror 9 can be moved likewise. Subsequently, the test is carried out again. This can be repeated until the condition that the cockpit elements 7, 8, 9 are functionally usable in the respective second positions is satisfied. The respective second positions which are detected in this way can then be stored in the control device.

Figure 3:
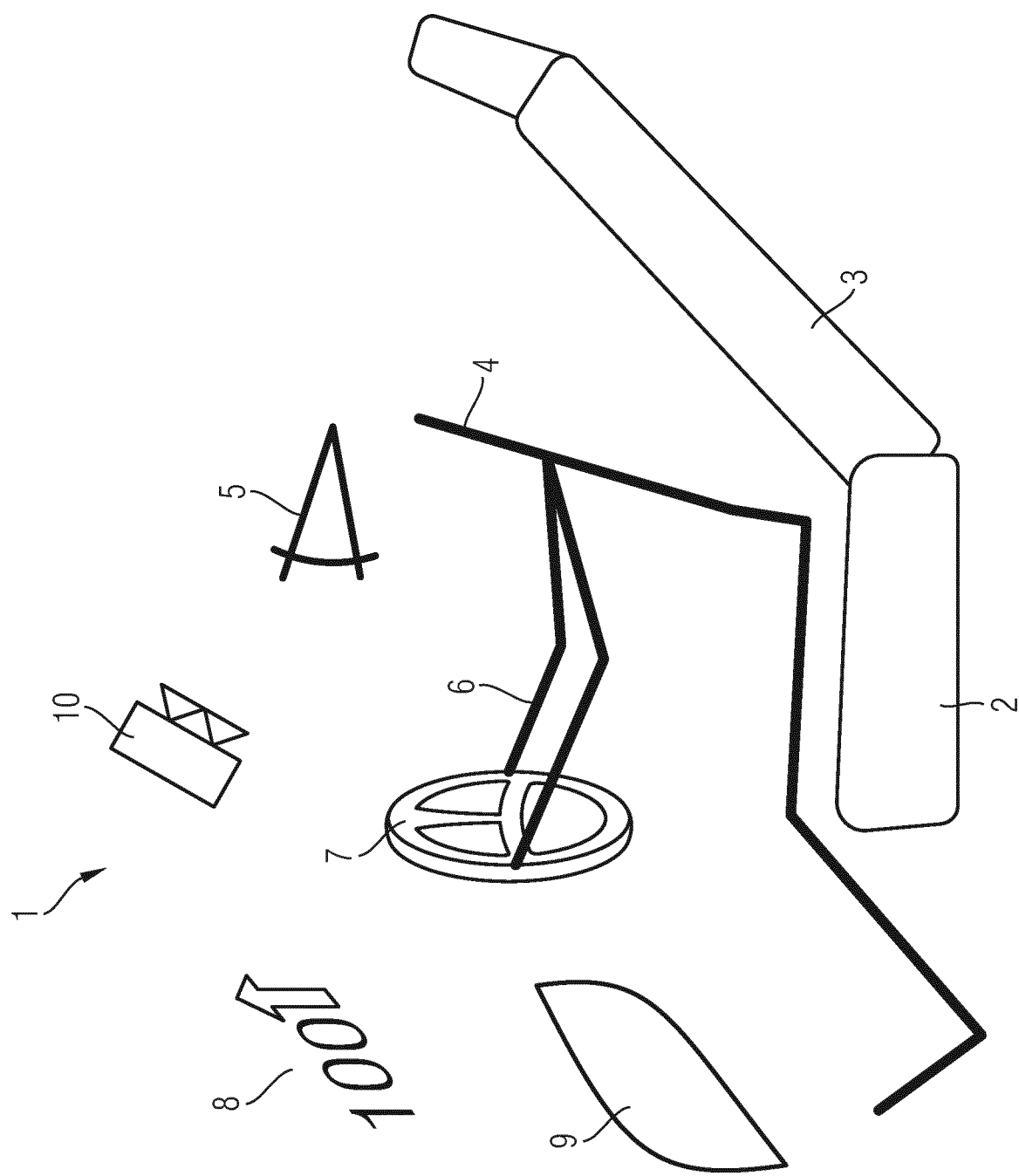
FIG. 3 is a schematic diagram of a cockpit of a vehicle according to an embodiment of the invention in a completely automatic driving mode in a second driving situation.

FIG. 3 shows a cockpit 1 of a vehicle according to an embodiment of the invention in a completely automatic driving mode in a second driving position. The seat 2, 3 and the cockpit elements 7, 8, 9 are still in the respective second position. In contrast with the illustration in FIG. 2, only the driver's position, but not the position of the other illustrated elements, is therefore changed in FIG. 3. In contrast to the driving situation illustrated in FIG. 2, the driver would like to, or is to, intervene in the events on the road in the driving situation illustrated in FIG. 3. It is to be noted that the driver has placed his upper body 4 in an upright position and is gripping the steering wheel 7 with his arms 6 and his hands. For example, the driver could be requested to reassume control over the vehicle (referred to as an assume control request) or to prepare himself to assume control imminently. It may also be the case that the driver would like to assume control over the steering wheel 7 even though this is not absolutely necessary. In any case, the invention permits the driver to assume control immediately in the illustrated exemplary situation without the position of the driver's seat 2, 3 and/or the position of the cockpit elements 7, 8, 9 having to be changed beforehand. The setting of the seatbelt which is explained above permits the driver to place his upper body 4 in an upright position, as illustrated, in the situation shown in FIG. 3.

LIST OF REFERENCE SYMBOLS

1 Cockpit
2 Seat bottom
3 Backrest of the seat
4 Driver's upper body
5 Driver's head
6 Driver's arms
7 Steering wheel
8 Head-up display
9 Exterior rearview mirror
10 Passenger compartment camera
11 Control Device
α Angle of inclination of the seat backrest The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
    a cockpit that includes a driver's seat and at least one driving-relevant cockpit element for functional use by a driver of the vehicle, wherein the vehicle is operable in a manual driving mode and in an at least partially automatic driving mode; and
    a control device that automatically repositions the driver's seat and/or the at least one cockpit element, while the driver is seated in the driver's seat, between a first position, in response to the vehicle being operated in the manual driving mode, and a second position, in response to the vehicle being operated in the automatic driving mode, such that the at least one driving-relevant cockpit element remains functionally usable by the driver in each of the manual and automatic driving modes,
    wherein the at least one driving-relevant cockpit element comprises an element selected from the group comprising: a steering wheel, a pedal, an exterior rearview mirror, a rearview mirror, and a head-up display.

2. The vehicle as claimed in claim 1, wherein repositioning the driver's seat comprises a change in a depth position and/or a change in a backrest inclination.

3. The vehicle as claimed in claim 1, wherein repositioning the at least one driving-relevant cockpit element comprises changing a height position and/or a depth position of the cockpit element.

4. A vehicle, comprising:
a cockpit that includes a driver's seat and at least one driving-relevant cockpit element for functional use by a driver of the vehicle, wherein the vehicle is operable in a manual driving mode and in an at least partially automatic driving mode; and
a control device that automatically repositions the driver's seat and/or the at least one cockpit element, while the driver is seated in the driver's seat, between a first position, in response to the vehicle being operated in the manual driving mode, and a second position, in response to the vehicle being operated in the automatic driving mode, such that the at least one driving-relevant cockpit element remains functionally usable by the driver in each of the manual and automatic driving modes,
wherein the control device is further configured to set a tautness of a seatbelt of the driver and/or a position of a belt retainer of the seatbelt, such that the at least one driving-relevant cockpit element is remains functionally usable by the driver in each of the manual and automatic driving modes.

5. The vehicle as claimed in claim 4, wherein the at least one driving-relevant cockpit element comprises an element selected from the group comprising: a steering wheel, a pedal, an exterior rearview mirror, a rearview mirror, and a head-up display.

6. The vehicle as claimed in claim 1, further comprising:
a detection device connected to the control device, wherein
the control device is configured to determine a body size and/or sitting position of the driver by processing data acquired by the detection device, and
the control device is configured to set the second position of the driver's seat and/or the second position of the at least one driving-relevant cockpit element as a function of the determined body size and/or sitting position of the driver.

7. The vehicle as claimed in claim 6, wherein the detection device is a passenger compartment camera.

8. The vehicle as claimed in claim 1, wherein the control device is configured to request the driver, by way of a display device of the vehicle, to use the at least one driving-relevant cockpit element if the second position of the driver's seat and/or the second position of the at least one driving-relevant cockpit element is set.

9. The vehicle as claimed in claim 4, wherein the setting of the position of the driver's seat comprises a change in a depth position and/or a change in a backrest inclination.

10. The vehicle as claimed in claim 4, wherein the setting of the position of the at least one driving-relevant cockpit element comprises changing a height position and/or a depth position of the cockpit element.

11. The vehicle as claimed in claim 4, further comprising:
a detection device connected to the control device, wherein
the control device is configured to determine a body size and/or sitting position of the driver by processing data acquired by the detection device, and
the control device is configured to set the second position of the driver's seat and/or the second position of the at least one driving-relevant cockpit element as a function of the determined body size and/or sitting position of the driver.

12. A method for operating a vehicle having a cockpit comprising a driver's seat and at least one driving-relevant cockpit element for functional use by a driver of the vehicle, wherein the vehicle is operable in a manual driving mode and in an at least partially automatic driving mode, the method comprising the steps of:
automatically repositioning the driver's seat and/or the at least one cockpit element, while the driver is seated in the driver's seat, between a first position, in response to the vehicle being operated in the manual driving mode, and a second position, in response to the vehicle being operated in the automatic driving mode, in such a way that the at least one driving-relevant cockpit element remains functionally usable by the driver in each of the manual and automatic driving modes; and
setting a tautness of a seatbelt of the driver and/or a position of a belt retainer of the seatbelt such that the at least one driving-relevant cockpit element remains functionally usable by the driver in each of the manual and automatic driving modes.

13. The method as claimed in claim 12, further comprising the steps of:
determining a body size and/or sitting position of the driver; and
setting the second position of the driver's seat and/or the second position of the at least one driving-relevant cockpit element as a function of the determined body size and/or sitting position of the driver.

14. The method as claimed in claim 13, further comprising the step of:
outputting a request to use the at least one driving-relevant cockpit element if the second position of the driver's seat and/or the second position of the at least one driving-relevant cockpit element is set.

15. The method as claimed in claim 12, further comprising the step of:
outputting a request to use the at least one driving-relevant cockpit element if the second position of the driver's seat and/or the second position of the at least one driving-relevant cockpit element is set.

\* \* \* \* \*